(12) United States Patent
Nikitin et al.

(10) Patent No.: US 8,969,813 B2
(45) Date of Patent: Mar. 3, 2015

(54) APPARATUSES AND METHODS FOR DETECTION OF RADIATION INCLUDING NEUTRONS AND GAMMA RAYS

(75) Inventors: Anton Nikitin, Houston, TX (US); Loren Patrick Roberts, Humble, TX (US); Nikolay N. Velker, Novosibirsk (RU); Alexandr A. Vinokurov, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 114 days.

(21) Appl. No.: 13/459,486

(22) Filed: Apr. 30, 2012

(65) Prior Publication Data

US 2012/0312994 A1 Dec. 13, 2012

Related U.S. Application Data

(60) Provisional application No. 61/494,665, filed on Jun. 8, 2011.

(51) Int. Cl.
*G01T 1/20* (2006.01)
*G01T 3/06* (2006.01)
(52) U.S. Cl.
CPC ............... *G01T 1/2002* (2013.01); *G01T 3/06* (2013.01)
USPC ....................................................... 250/362
(58) Field of Classification Search
CPC .......... G01T 1/2018; G01T 1/202; G01T 1/20
USPC ....................................................... 250/362
See application file for complete search history.

(56) References Cited

U.S. PATENT DOCUMENTS

| | | | |
|---|---|---|---|
| 4,136,278 A | 1/1979 | Oliver | |
| 5,393,981 A * | 2/1995 | Szabo et al. | 250/367 |
| 5,481,114 A * | 1/1996 | Daniel et al. | 250/390.11 |
| 6,639,210 B2 | 10/2003 | Odom et al. | |
| 7,502,442 B2 * | 3/2009 | Rushbrooke et al. | 378/57 |
| 2005/0023479 A1 * | 2/2005 | Grodzins | 250/390.11 |
| 2005/0258371 A1 | 11/2005 | Stein et al. | |
| 2007/0051892 A1 * | 3/2007 | Warburton et al. | 250/362 |
| 2007/0158573 A1 * | 7/2007 | Deych | 250/370.11 |
| 2008/0191138 A1 | 8/2008 | Kastalsky et al. | |
| 2008/0284428 A1 * | 11/2008 | Fiedler et al. | 324/307 |
| 2008/0315106 A1 * | 12/2008 | Buchinsky | 250/370.09 |
| 2011/0029246 A1 | 2/2011 | Nikitin et al. | |

(Continued)

OTHER PUBLICATIONS

A.R. Spowart, "Neutron scintillation glasses: Part II; the effects of temperature on pulse height and conductivity", Nuclear Instruments and Methods, 1977, v. 140, 19-28.

(Continued)

*Primary Examiner* — Marcus Taningco
(74) *Attorney, Agent, or Firm* — Cantor Colburn LLP

(57) ABSTRACT

A scintillation detector includes: a photodetector; a scintillating material configured to emit light in response to exposure to ionization particles; an optically transparent material having a light absorption coefficient that is less than a light absorption coefficient of the scintillating material, the optically transparent material optically coupled to a surface of the scintillating material and configured to transmit the emitted light; and a reflective material at least partially surrounding the scintillating material and the optically transparent material, the reflective material configured to reflect the emitted light and direct the emitted light toward the photodetector.

20 Claims, 16 Drawing Sheets

(56) References Cited

U.S. PATENT DOCUMENTS

| | | | |
|---|---|---|---|
| 2011/0192979 A1* | 8/2011 | Cahill | 250/362 |
| 2012/0012751 A1* | 1/2012 | Saenger | 250/362 |
| 2012/0126106 A1* | 5/2012 | Zhou et al. | 250/269.6 |
| 2012/0161011 A1* | 6/2012 | Menge et al. | 250/361 R |

OTHER PUBLICATIONS

B.V. Shulgin, V.L. Petrov, V.A. Pustovarov, V.I. Arbuzov, D.V. Raikov, K.V. Ivanovskih, A.V. Ischenko "Scintillation detectors of neutrons based on Li6 glass activated Ce", Solid State Physics, 2005, v. 47, 1364-1367 (in Russian).

Carel W.E. van Eijk "Neutron PSDs for the next generation of spallation neutron sources" Nuclear Instruments and Methods in Physics Research A 477 (2002) 383-390.

G. Hull, S. Du, T. Niedermayr, S. Payne, N. Cherepy, A. Drobshoff, L. Fabris "Light collection optimization in scintillator-based gamma-ray spectrometers" Nuclear Instruments and Methods in Physics Research A 588 (2008) 384-388, ScienceDirect.

B.G. Hubner, W.D. Bruck and J.H. Dudek, "A novel neutron detector for porosity logging" 1990 IEEE Nuclear Science Symposium, Record pp. 817-819, 1990.

Rihua Mao, Liyuan Zhang, Ren-Yuan Zhu, "Optical and Scintillation Properties of Inorganic Scintillators in High Energy Physics" IEEE Transactions on Nuclear Science, vol. 55, No. 4, Aug. 2008. pp. 2425-2431.

Notification of Transmittal of the International Search Report and the Written Opinion of the International Searching Authority, or the Declaration; PCT/US2012/041237; Feb. 13, 2013.

Lithium Glass Scintillators, www.detectors.saint-gobain.com., Saint-Gobain Ceramics & Plastics, Inc., Jul. 2008, 2 pages.

Lithium Glass Scintillators. http://www.appscintech.com/sites/default/files/LithiumGlass-physicalproperties.pdf; Sep. 10, 2009, 3 pages.

S. Smith, Custom Filters, Chapter 17, Arbitrary Frequency Response, "The Scientist and engineer's Guide to Digital Signal Process", California Technical Publishing, 1997-1999, ISBN 0-9660176-6-8 electronic, pp. 297-310.

\* cited by examiner

US 8,969,813 B2

APPARATUSES AND METHODS FOR DETECTION OF RADIATION INCLUDING NEUTRONS AND GAMMA RAYS

REFERENCE TO RELATED APPLICATION

The present application claims the benefit of and priority to U.S. Provisional Application No. 61/494,665, entitled "APPARATUSES AND METHODS FOR DETECTION OF RADIATION INCLUDING NEUTRONS AND GAMMA RAYS", filed on Jun. 8, 2011, under 35 U.S.C. §119(e), which is incorporated herein by reference in its entirety.

BACKGROUND

Pulsed neutron measurement tools are useful in a variety of applications, such as subterranean operations. Examples of subterranean operations include processes for evaluating subterranean formations. For example, pulsed neutron porosity measurements involve bombarding a formation with high energy neutrons and monitoring the attenuation of the neutron flux by the formation at different distances from the neutron source. Pulsed neutron spectroscopy is based on the measurement of the spectrum of gamma rays emitted by the formation when it is irradiated by high energy neutrons. Different nuclei in formation materials emit characteristic gamma rays, allowing for the estimation of formation constituents and properties such as porosity and oil/gas saturation. Formation sigma measurements are based on the measurements of the rate of decay of a thermal neutron cloud in the formation that is created by the pulsed neutron source.

Such tools utilize scintillation detectors to detect neutrons and gamma rays. Scintillation detectors include a scintillation material and a photodetector. An ionization particle (e.g., a neutron or a gamma ray emitted in response to neutron irradiation of a formation) interacts with the scintillation material and part of the energy released in the interaction reaction is converted into photons which travel inside of the scintillator until they reach the optical window of the photodetector. The photodetector converts the photons into an output electrical signal.

The accuracy of the measurement of the energy created in the interaction of ionization radiation with the scintillation material of the detector depends on how much light emitted from the scintillation event reaches the optical window of the photodetector. This can be affected by factors such as absorption in the scintillation material and at interfaces between the scintillation material and reflective surfaces of a scintillation assembly or the photodetector optical window. Losses of the emitted light can reduce the precision and accuracy of scintillation detectors.

SUMMARY

A scintillation detector includes: a photodetector; a scintillating material configured to emit light in response to exposure to ionization particles such as neutrons and gamma arrays; an optically transparent material having a light absorption coefficient that is less than a light absorption coefficient of the scintillating material, the optically transparent material optically coupled to a surface of the scintillating material and configured to transmit the emitted light; and a reflective material at least partially surrounding the scintillating material and the optically transparent material, the reflective material configured to reflect the emitted light and direct the emitted light toward the photo detector.

A method of processing a scintillation detector signal includes: receiving a detection signal from a scintillation detector, the scintillation detector including a first scintillating material and a second scintillating material, the second scintillating material disposed in optical contact with the first scintillating material and configured to transmit light emitted from the first scintillating material, the signal including constituent pulses from each of the first and second materials; applying a filter configured to convert a pulse produced by one of the first and second scintillation materials into a unipolar pulse and convert a pulse produced by another of the first and second scintillation materials into a bipolar pulse; identifying positive and negative maxima in the filtered signal; and identifying the constituent pulses corresponding to being produced by the first scintillating material and being produced by the second scintillating material based on the presence of the positive and negative maxima in the filtered signal.

An apparatus for estimating at least one property of an earth formation includes: a carrier configured to be disposed in the formation; a source of fast neutrons disposed at the carrier and configured to irradiate the formation; at least one radiation scintillation detector disposed at the carrier and configured to measure at least one of neutrons scattered by the formation and gamma rays emitted by the formation; and a processor in communication with at least one scintillation detector to receive measurement data and estimate at least one property. At least one scintillation detector includes: a photodetector; a scintillating material configured to emit light in response to exposure to ionization particles such as neutrons and gamma rays; an optically transparent material optically coupled to a surface of the scintillating material and configured to transmit the emitted light; and a reflective material at least partially surrounding the scintillating material and the optically transparent material, the reflective material configured to reflect the emitted light and direct the emitted light toward the photodetector.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Apparatuses and methods for detecting ionizing radiation such as neutrons and gamma rays and/or characterizing subterranean formations are described herein. The apparatuses and methods include improved scintillation detectors (e.g., neutron, and neutron and gamma ray detectors) for use in applications such as borehole and earth formation measurements. Exemplary embodiments of the detectors include a scintillating assembly having a scintillating material and an optically transparent material configured to transmit light by the scintillating material and having a light attenuation coefficient or absorption coefficient that is less than the light attenuation or absorption coefficient of the scintillating material.

Figure 1:
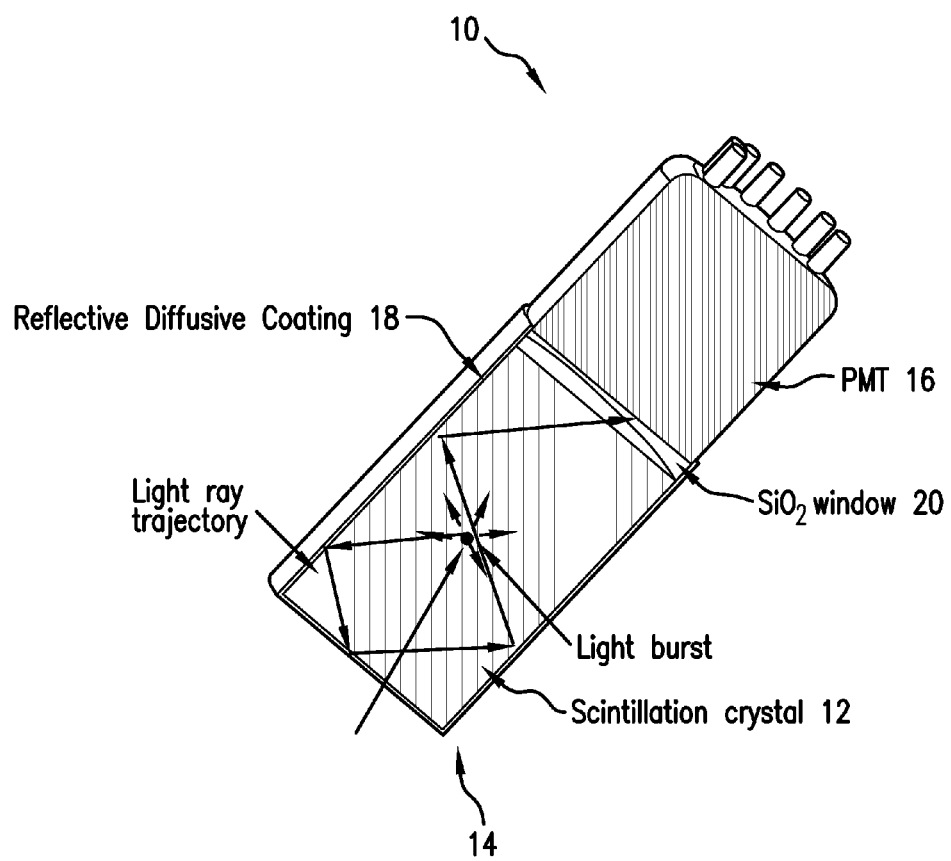
FIG. 1 is a perspective view of an embodiment of a scintillation detector.

A scintillation detector 10 is illustrated in FIG. 1. The detector 10 includes a scintillation material 12 (e.g., a scintillation crystal) disposed in a scintillation assembly 14, and a photodetector 16. Any suitable scintillating materials may be used, such as lithium-6 materials including lithium glasses or other scintillation materials containing the $^6$Li isotope, sodium iodide material (e.g., NaI(Tl) crystals, or sodium iodide activated with thallium) or their combination. Interaction between particles of ionization radiation (e.g., neutrons or gamma rays) and the scintillation material 12 produces a number of visible light photons which are emitted uniformly and isotropically. Emitted photons travel through the scintillation assembly and reflect from walls 18 of the scintillation assembly 14 until they reach an optical window 20 of the photodetector 16. The photodetector 16, such as a photomultiplier tube (PMT), converts visible photons into an electronic signal, amplifies the signal, and creates a current pulse. The current pulse amplitude is proportional to the number of the visible light photons collected at the optical window 20.

Figure 2:
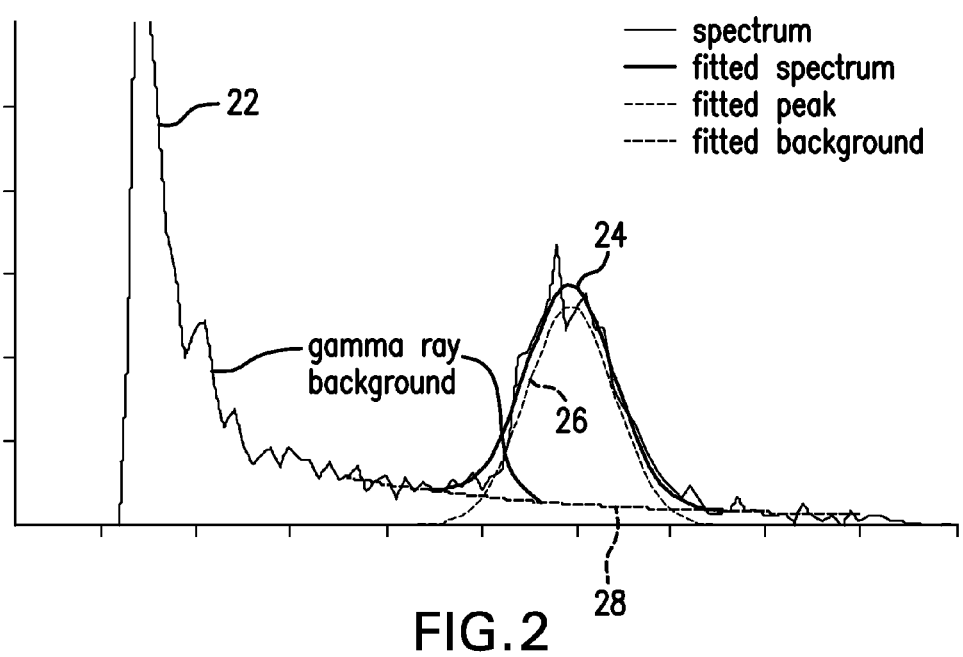
FIG. 2 is a pulse height spectrum generated by detection of neutrons and gamma rays by a scintillation detector made of Li6 glass.

Li6 glass scintillation detectors (Li6 detectors) are typically used to measure the flux of neutrons. A Li6 glass detector is sensitive to all types of ionization particles and can be used to measure a pulse height spectrum. Neutron flux can be derived from this spectrum as an intensity of the neutron peak. An example of this is shown in FIG. 2, which illustrates a pulse height spectrum 22, and a fitted spectrum 24. The spectrum can be further processed to separate a fitted peak 26 and a fitted background 28 corresponding to the neutron flux and gamma ray background, respectively. The precision and accuracy of the neutron flux determination from pulse height spectra measured by a Li6 detector is defined by how well this peak can be separated from such overlapping features as gamma ray background, other peaks and other features present in the spectrum.

Figure 5:
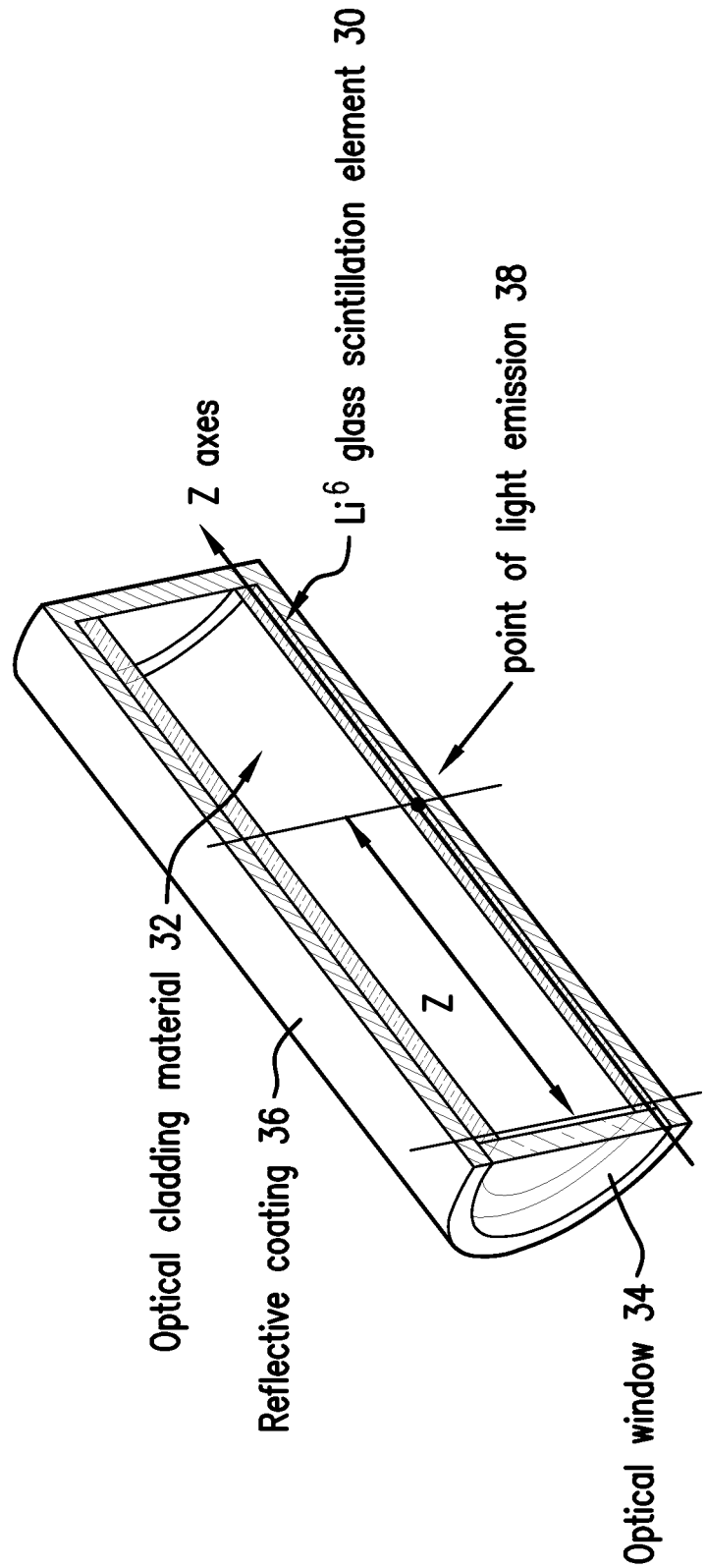
FIG. 5 is a perspective cross-sectional view of an embodiment of a scintillation detector including a scintillation assembly.
Figure 6:
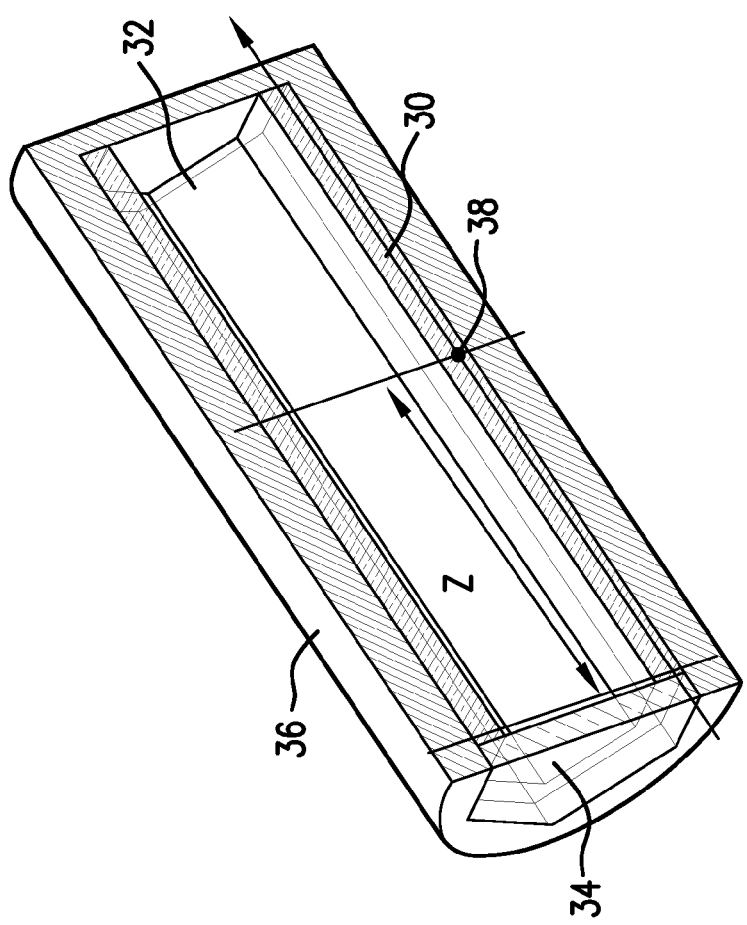
FIG. 6 is a perspective cross-sectional view of an embodiment of a scintillation detector including a scintillation assembly.
Figure 7:
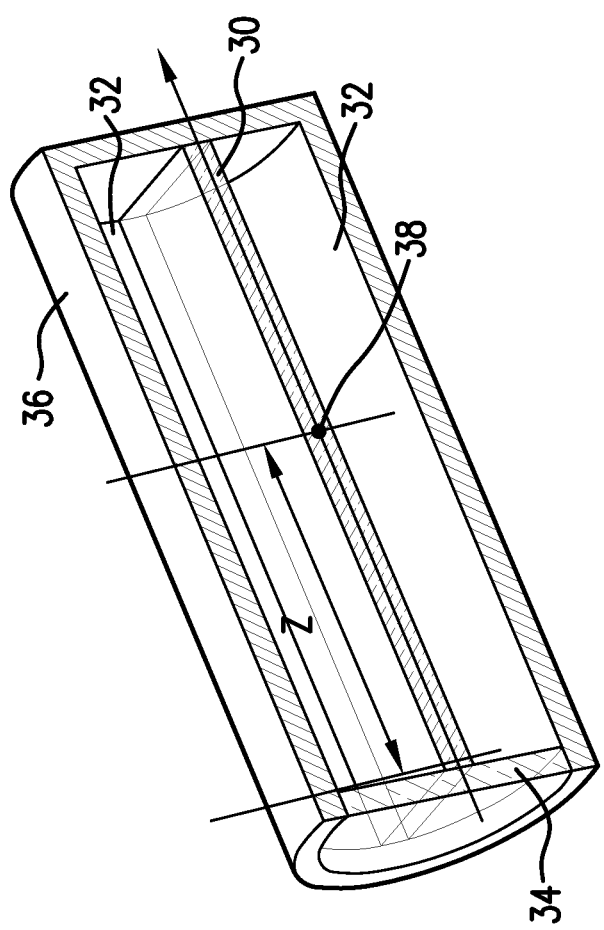
FIG. 7 is a perspective cross-sectional view of an embodiment of a scintillation detector including a scintillation assembly.

FIGS. 5-7 illustrate exemplary embodiments of the detector 10 and the scintillation assembly. In the following embodiments, the detector includes a scintillating material such as Li6 glass and a cladding material. The cladding material includes any optically transparent material having an index of refraction that is greater than one. A cladding material is described herein as an optically transparent material having a light attenuation coefficient or absorption coefficient that is less than the light attenuation or absorption coefficient of the scintillating material for at least one or more wavelengths that are emitted from the scintillating material. In one embodiment, the cladding material has light absorption coefficient that is essentially zero.

In each of these embodiments, the scintillation assembly 14 includes a scintillating element 30, such as a Li6 glass component, and an optically transparent cladding 32. The cladding is optically coupled to a surface of the scintillating element 30 and is configured to receive and transmit light emitted from the scintillating element 30. For example, the cladding 32 can be directly adjacent to one or more of the surfaces of the scintillation element 32, or can be separated by a partially reflecting (one-way) layer to allow emitted light to be transmitted from the scintillating element 30 to the cladding 32 but prevent the emitted light from re-entering the scintillating element 30. The cladding 30 and the scintillating element are optically coupled to an optical window 34 of a photodetector 16 or other means for transmitting the emitted light into the photodetector 16. A reflective layer 36 at least partially surrounds the scintillating element 30 and the cladding 32 (and may also partially surround the window 34) so that all of the emitted light is eventually reflected into the window 34.

Figure 3:
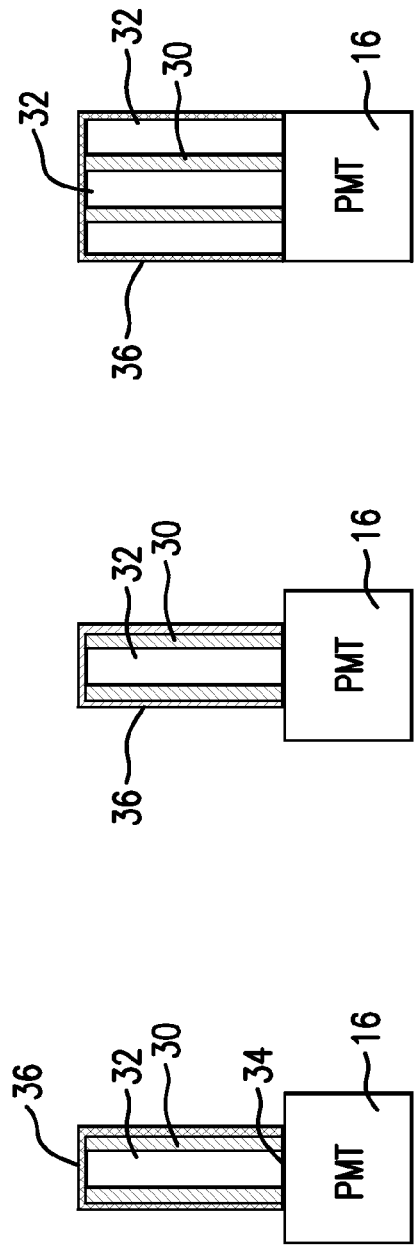
FIGS. 3A-3C are cross-sectional views of embodiments of a scintillation detector including a scintillation assembly.

FIGS. 3A-C illustrate exemplary configurations of the detector 10 including a hollow cylindrical scintillating element 30, such as a Li6 glass material. For example, the scintillating element can include a GS20 lithium glass that has a maximum of radioluminescence spectrum at 395 nm upon exposure to neutrons and gamma rays.

The cladding 32 is optically coupled to the scintillating element and is transparent to at least wavelengths emitted by the scintillating element. The cladding 32 may include materials such as fused silica or a gas such as air, or a transparent polymer. In the embodiments of FIGS. 3A and 3B, the reflective layer 36 is disposed against the outer surface of the scintillation element and is thus adjacent to the scintillation element. In the embodiment of FIG. 3C, an additional transparent cladding layer is disposed between the scintillation element 30 and the reflective layer 36.

In one embodiment, as shown in FIGS. 3A-3C, the hollow cylindrical scintillating element 30 has a relatively thin wall and thus a small volume of scintillating material (relative to the scintillation assembly volume) through which light needs to travel. As a result, light absorption by the scintillating material is reduced and the resulting signal spectrum is improved.

Although the volume of scintillating material is reduced, it is sufficient to absorb a substantial amount of neutron flux passing through the detector so that the detected signal is indicative of the actual neutron flux passing through the detector. For example, the interaction mechanism of thermal neutrons with Li6 glass scintillation material is based on the following reaction:

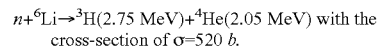

The concentration of the $^6$Li isotope in GS20 lithium glass is about 22 mol %. As a result, about a 2 mm thickness of GS20 glass absorbs greater than 90% of the thermal neutron flux passing through it, and thus the scintillation assembly 14 can detect with excellent thermal neutron detection efficiency without filling all its internal volume with scintillation material.

Figure 4:
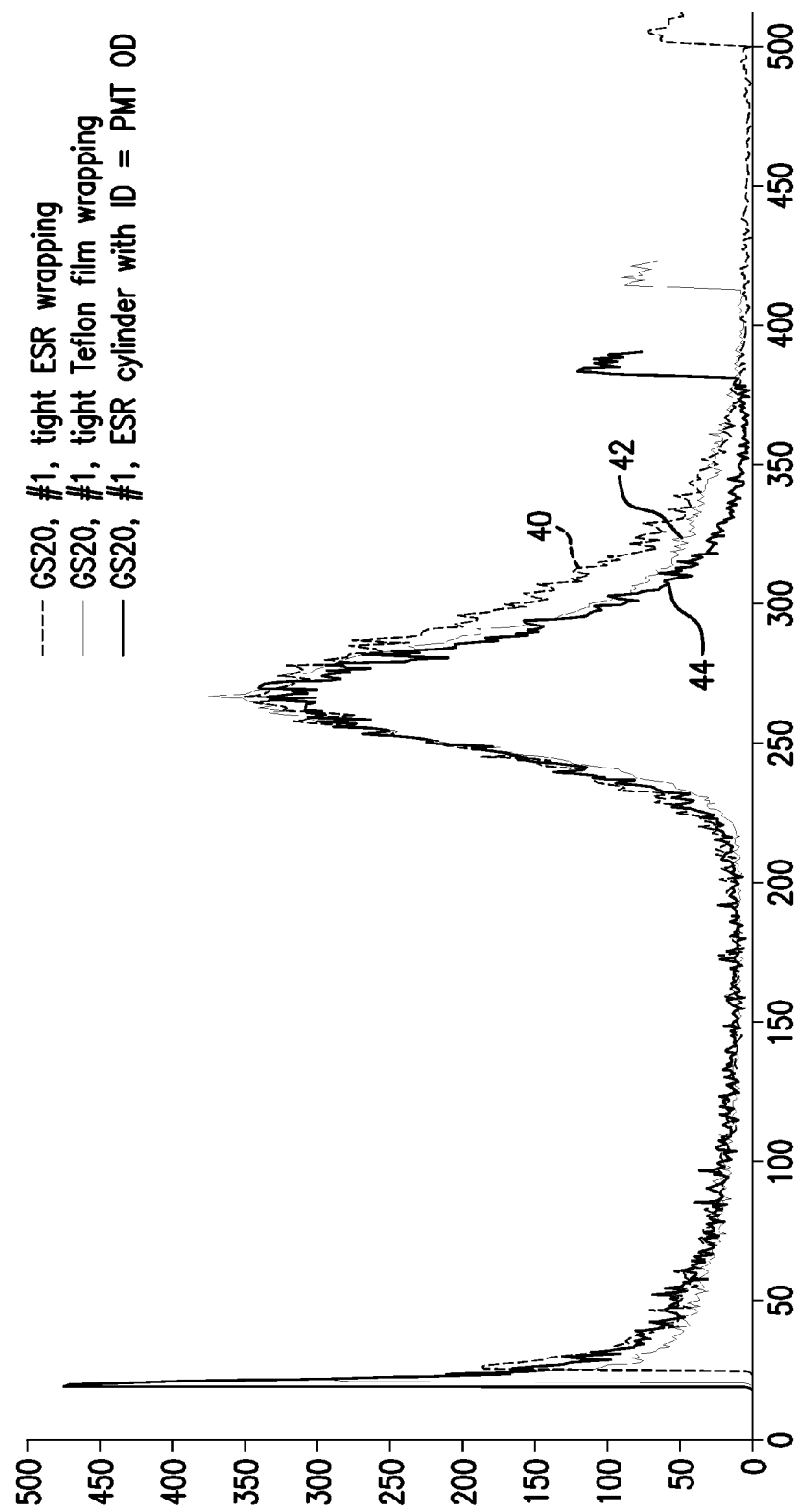
FIG. 4 illustrates pulse height spectra measured with the scintillation detectors of FIGS. 3A-3C.

FIG. 4 illustrates exemplary results of measurements taken by the detectors of FIGS. 3A-C. In this example, an AmBe neutron source for emitting neutrons was located approximately 10 cm from the scintillation detector. All spectra were acquired using the same signal gain parameters, and were normalized by intensity. Spectrum 40 represents the pulse height spectrum produced by the detector of FIG. 3A, spectrum 42 represents the pulse height spectrum produced by the detector of FIG. 3B, and spectrum 44 represents the pulse height spectrum produced by the detector of FIG. 3C.

The exemplary scintillation assemblies used to produce the spectra of FIG. 4 each included a R980 PMT having an outside diameter (OD) of about 1.5 inches and a hollow cylinder scintillation element 30 made from GS20 lithium glass. The hollow cylinder had a length of about 2.5 inches, an outside diameter of about 23 mm and an inner diameter of about 18 mm. In this example, the reflective layer 36 for the embodiments of FIGS. 3A and 3C included an enhanced specular reflectance (ESR) film, and the reflective layer 36 for the embodiment of FIG. 3B included a Teflon wrapping. For the embodiment of FIG. 3C, the reflective layer 36 was a cylinder made of ESR film.

As can be seen from FIG. 4, all of the spectra demonstrate a well-defined peak with minimal tailing, where spectrum 40 is measured by detector shown in FIG. 3A, spectrum 42 is measured by the detector shown in FIG. 3B and spectrum 44 is measured by detector shown in FIG. 3C. On average the specular reflective wrapping (e.g., ESR film) provides a longer pathway of the light inside of the detector than a diffusive reflective wrapping such as Teflon tape, and thus provided worse results of pulse height spectra measurements (wider neutron peak in spectrum 40 in comparison with neutron peak in spectrum 42). However, increasing the separation between the scintillating element 30 and the reflective layer 36 improves the resulting spectrum 44. For example, the detector of FIG. 3C includes an approximately 7 mm gap between the ESR wrapping and the scintillation element 30. This gap further reduces the length of the optical path of the emitted light through scintillating material, which results in smaller losses of emitted light and a substantially improved quality of the measured pulse height spectrum.

FIGS. 5 and 6 show embodiments of the scintillation assembly 14, which include a hollow cylindrical scintillating element 30 surrounding and contacting a solid cylindrical cladding 32. The solid cylindrical cladding 32 has an external diameter, shape and cross-sectional area that are proportional to or approximately equal to the inner diameter, shape and area of the scintillating element 30. The reflective coating 36 contacts and surrounds the scintillation element 30. The scintillating element may be any hollow shape, such as a circular cylinder as shown in FIG. 5, a hexagonal cylinder shown in FIG. 6, or octagonal cylinder that has an end that is optically coupled to the window 34. The reflective coating 36 may be in direct contact with the scintillating element 30, or an additional cladding material may be disposed between the scintillating element 30 and the reflective coating 36.

FIG. 7 shows an embodiment where the cladding 32 is disposed between the scintillating element 30 and the reflective coating 36. In this embodiment, the scintillating element includes opposing surfaces that are each optically coupled the cladding 32. For example, the scintillating element 30 has the shape of a flat plate whose axes coincides with the longitudinal axis of the scintillation assembly 14 and whose width is at least approximately equal to the internal diameter of the reflective coating 36. This configuration provides another way to improve the collection of the light emitted in scintillation event at the detector's optical window by improving the extraction of light from the absorbing scintillating element 30 to the non absorbing (transparent) media in the cladding 32 surrounding it.

Figure 8:
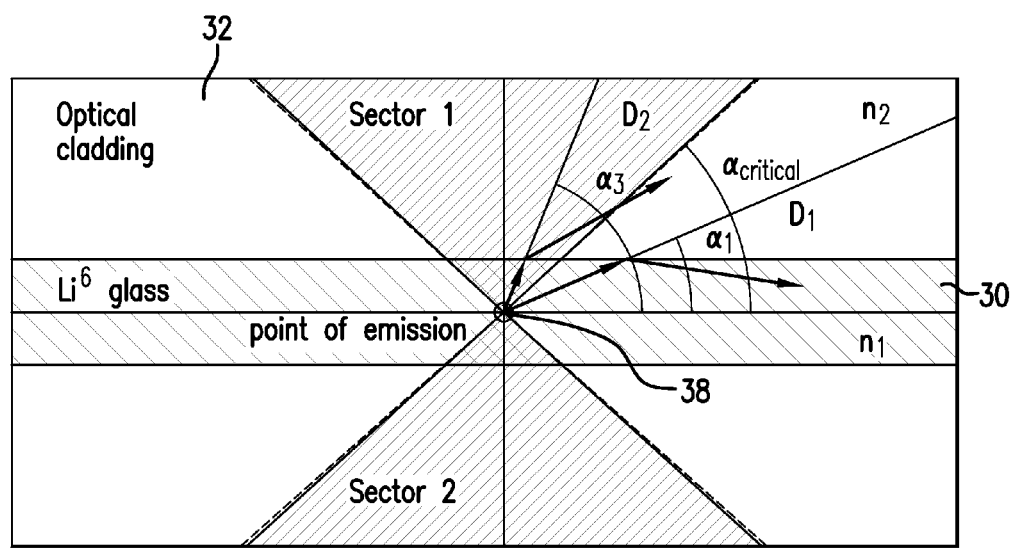
FIG. 8 is a close-up cross-sectional view of an embodiment of the scintillation assembly of FIG. 7.

FIG. 8 shows a side cross-sectional view of a portion of the scintillation assembly 14 of FIG. 7. The scintillating element 30 has a first refractive index "$n_1$" and the cladding 32 has a second refractive index "$n_2$". If n1 is greater than n2, only scintillation light emitted in Sector 1 and Sector 2, i.e., emitted light incident on the element/cladding boundary at an angle "α" that is less than a critical angle "$α_{critical}$" defined by Snell's Law, is extracted into the cladding 32. In one embodiment, the scintillating element 30 and the cladding 32 have at least substantially the same index (i.e., $n_2 = n_1$), such that at least substantially all light emitted inside of the scintillating glass can be extracted into the claddings.

In one embodiment, the cladding refractive index $n_2$ is greater than the scintillating material refractive index $n_1$. In this embodiment, substantially all of the emitting light travels from the element 30 into the cladding 32. However, at least some of the light reflected from the coating 36 will strike the element/cladding boundary at an angle greater than "$α_{critical}$" and reflect back into the cladding due to total internal reflection. In this way, the amount of light that is reflected from the coating 32 into the element 30 is decreased, as the overall length of the path of emitted light inside of the element 30 (and the related absorption) is decreased.

The following example is provided to illustrate various aspects of the embodiments of the scintillation assembly 14. In this example, the performance of various embodiments of the designs of FIGS. 5-7 was calculated by Monte-Carlo based modeling of the light transport inside of the scintillation assemblies. The modeling was performed for the case of the light isotropically emitted inside of the scintillation element by a point source 38.

In this example, for each of the embodiments of FIGS. 5-7, the internal diameter of the 36 reflective coating is about 23 mm, the length of the scintillation element 30 is about 65 mm, the thickness of the scintillation element is about 2.5 mm for the "hollow cylinder" and "hollow hexagon" models (shown in FIGS. 5 and 6 respectively) and about 4 mm for the "flat plate" model shown in FIG. 7. The distance "Z" between the source 38 and optical window 34 was varied and the relative amount of emitted light which was collected at the optical window ("collected light") was calculated. Calculated "collected light" or "CL" is a ratio between the amount of light entering the optical window 34 and the amount of light emitted in the scintillation event (i.e., $CL = I_{collected}/I_{emitted}$).

Figure 9:
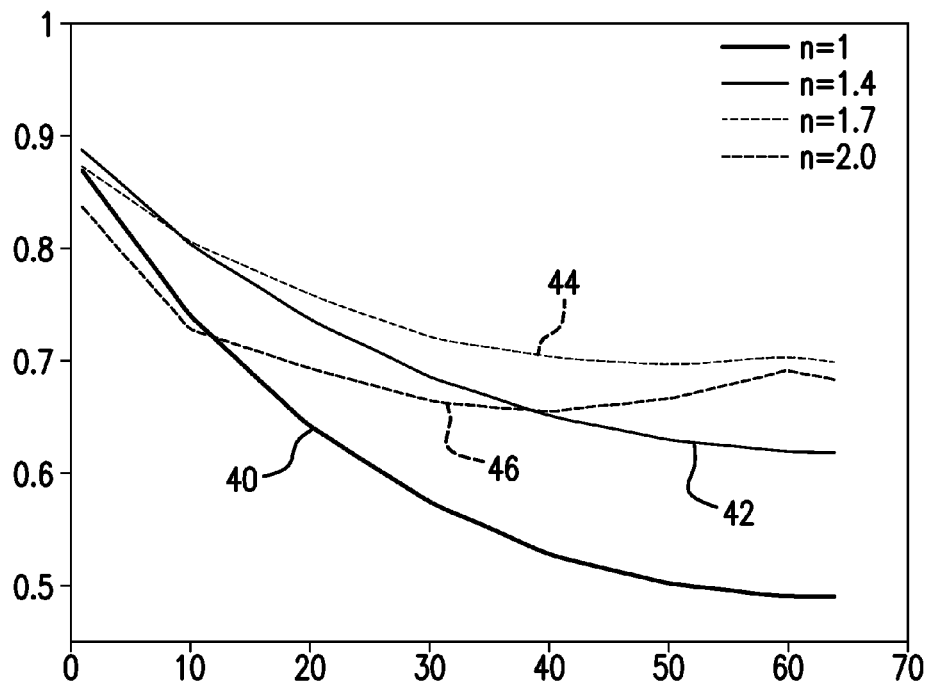
FIGS. 9, 10 and 11 illustrate collected light data for various embodiments of the scintillation detectors of FIGS. 5, 6 and 7.
Figure 10:
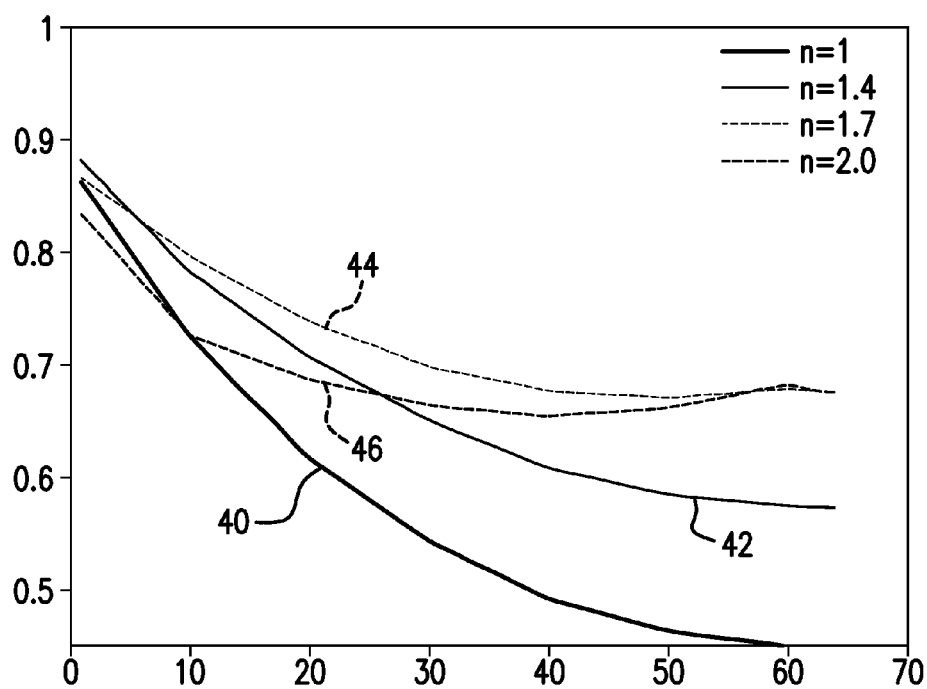
Figure 11:
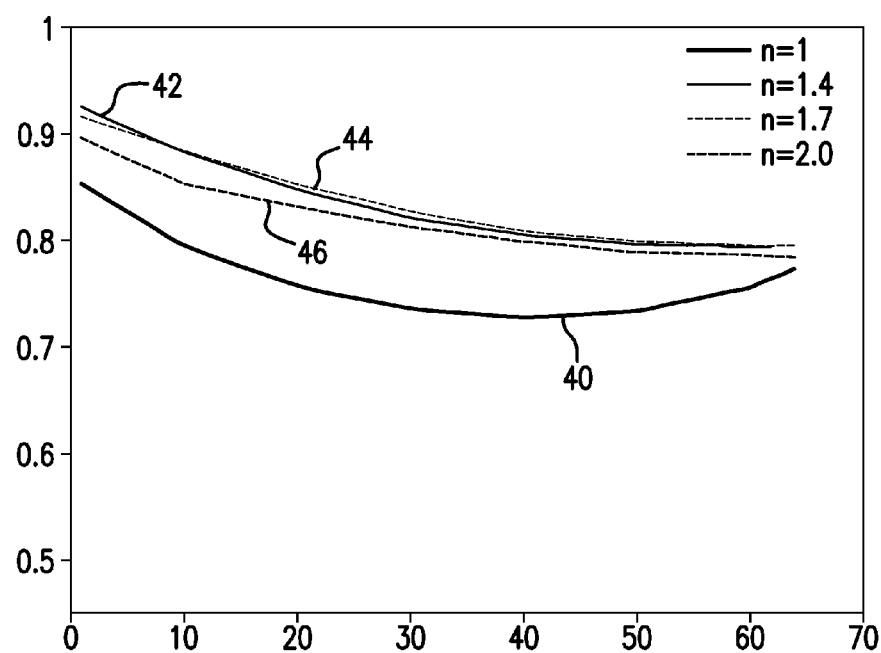

FIGS. 9, 10 and 11 show the amount of collected light vs. distance Z for various indexes of refraction $n_2$ of the cladding 32. FIG. 9 represents results using the hollow cylinder model, FIG. 10 represents results using the hollow hexagon model, and FIG. 11 represents results using the flat plate model.

In this example, the scintillation element 30 for each model was Li6 glass having an absorption coefficient of about 0.02 cm$^{-1}$ and a refractive index $n_1$ of about 1.5 and an optical cladding material 32 having an absorption coefficient of about 0 cm$^{-1}$. The Reflective coating 36 was a 100% diffusive reflector with a coefficient of reflection "R" of 99.5%, and the optical window 34 was a quartz material having an index of refraction of about 1.5. The amount of collected light (CL) for each model is shown by curve 40 for the cladding 32 having $n_2$ of about 1, curve 42 for the cladding 32 having $n_2$ of about 1.4, curve 44 for the cladding 32 having $n_2$ of about 1.7, and curve 46 for the cladding 32 having $n_2$ of about 2.0.

In the present example, it can be seen that, in general, a scintillation assembly having a cladding with an index of greater than 1 and less than 2.0 (e.g., $n_2$=about 1.4 or 1.7) shows increased collected light. In addition, the flat plate design shows improved collected light relative to other designs.

Figure 12:
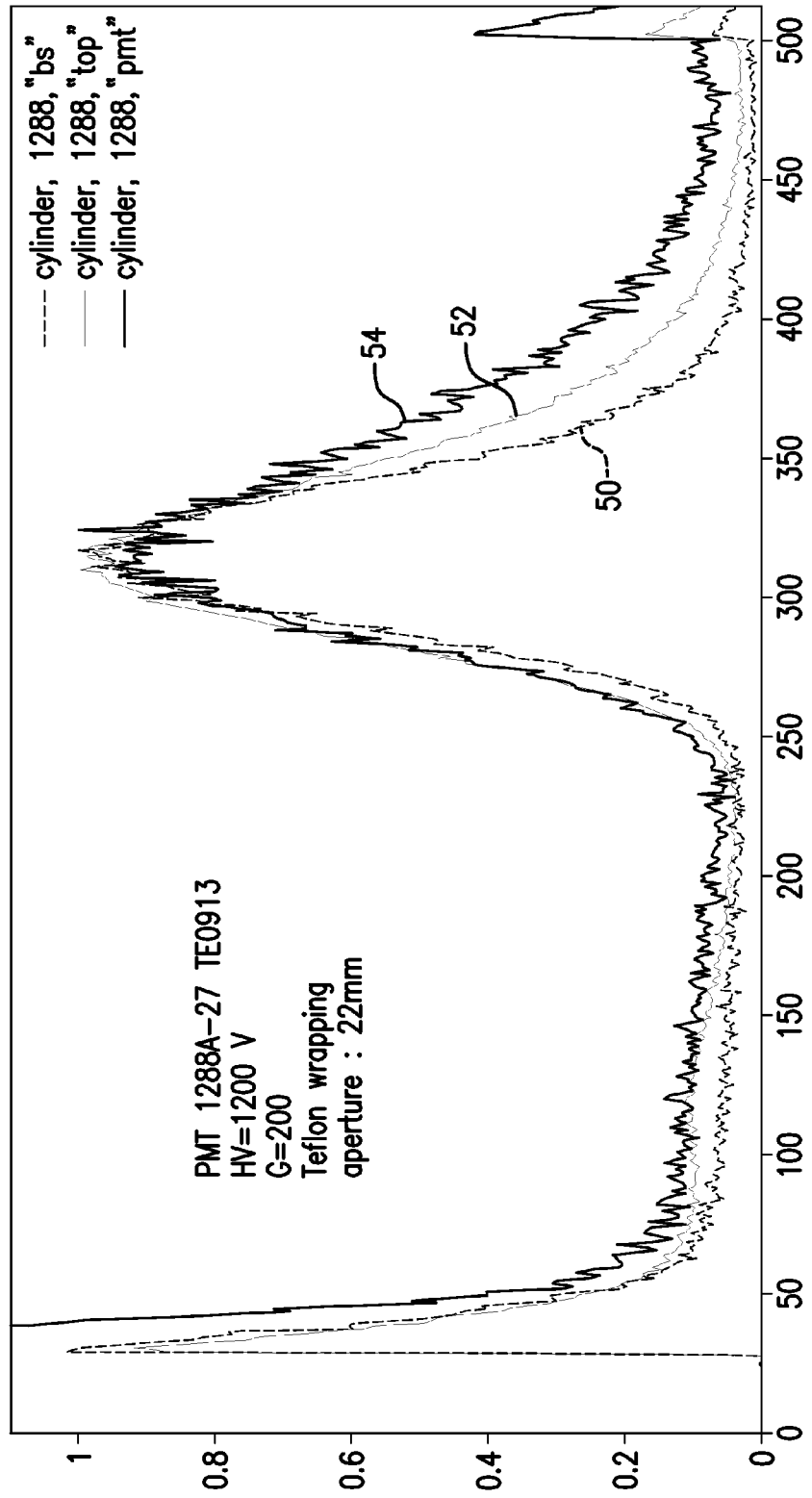
FIG. 12 illustrates pulse height spectra associated with the scintillation detectors of FIG. 7.
Figure 13A:
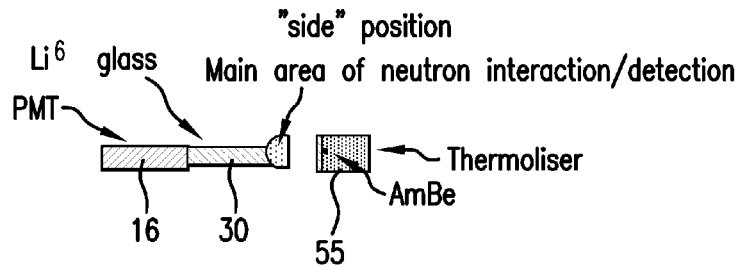
FIGS. 13A-13C illustrate exemplary positions of a neutron source associated with the spectra of FIG. 12.
Figure 13B:
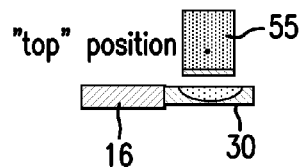
Figure 13C:
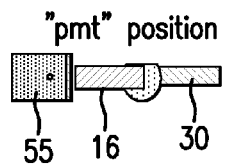

FIG. 12 shows exemplary pulse height spectrum results for a radiation detector having a flat plate model such as that shown in FIG. 7. In this example, the detector included a GS20 lithium glass scintillation material having a thickness of about 1 mm, a width of about 1.5 inches and a length of about 4 inches. The reflective coating was made from Teflon film and had an internal diameter of about 1.5 inches. Two semicylindrical claddings made of acrylic plastic ($n_2$ of about 1.45) contact the scintillating material and the reflective coating. The scintillation assembly was optically coupled to a 1288 Hamamatsu PMT having an optical window 34 with an outside diameter of about 24 mm. FIG. 12 shows a pulse height spectra 50, 52 and 54 measured by the detector that was exposed to an AmBe neutron source 55 located respectively at a "side" position (see FIG. 13A), a "top" position (see FIG. 13B) and a "pmt" position (see FIG. 13C) relative to the detector. As shown in FIG. 12, all obtained spectra have a well defined peak with only slight asymmetry and a minimal high energy tail.

Figure 14:
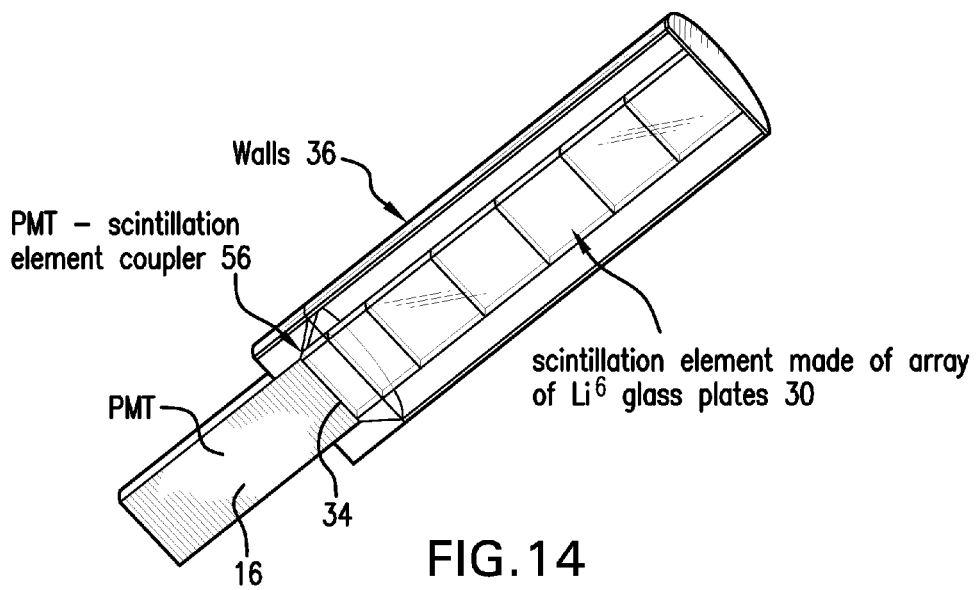
FIGS. 14-16 are perspective views of embodiments of scintillation detectors.
Figure 15:
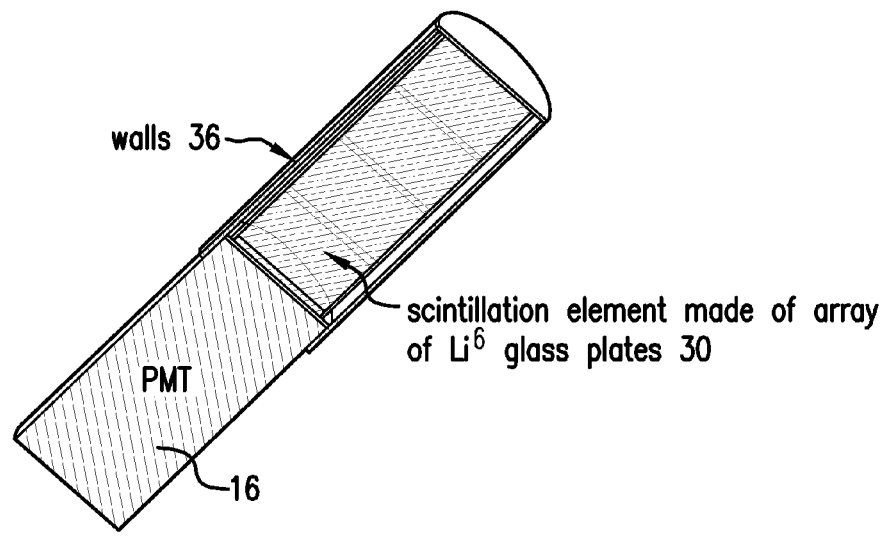
Figure 16:
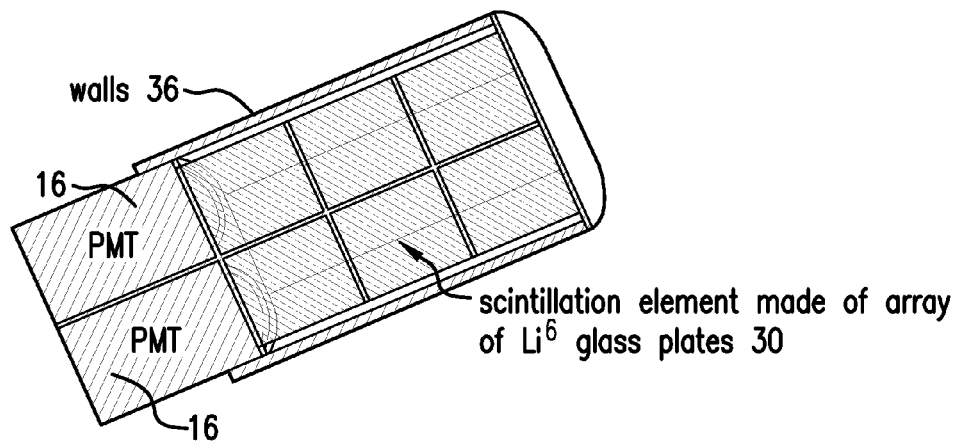

FIGS. 14-16 illustrate several other "flat plate" designs of detectors configured for using different types of PMTs. All of these designs include scintillating elements 30 made of an array of flat plates of Li6 glass, although the type, shape and configuration of the scintillating elements are not so limited. The plates are surrounded by a cladding material, which may be made from a solid glass or a transparent encapsulant such an epoxy, a silicone resin or silicone elastomer having an index of refraction of, e.g., about 1.4 or 1.5. Such designs can compensate for variations in the light yield of the scintillation material for different plates of Li6 glass (e.g., plates emitting more light per ionization event due to higher quality are located in the array farther from the optical window) and also can reduce or minimize the influence of differences in thermal expansion coefficients between the cladding material, the optical coupling material (e.g., optical window) and the scintillating material itself by minimizing the stress at the interface of the scintillating element and the optical coupling material by using smaller pieces of Li6 glass.

For example, the scintillation detector 10 of FIG. 14 has an Li6 glass scintillating element 30 that includes six 1-inch by 1-inch plates and the optical detector 16 is an R9722 PMT (1.5 inch outside diameter, qualified up to 175 degrees C.) or an R1288 PMT (1 inch outside diameter, measurement-while drilling (MWD) qualified up to 200 degrees C). An optical coupler 56 has a shape that is optimized for collection of emitted light at the PMT optical window 34. Another exemplary configuration, shown in FIG. 15, includes a Li6 glass scintillating element having four 1.5-inch by 1-inch plates and the optical detector 16 is a R9722 PMT. FIG. 16 shows an example including a Li6 glass scintillating element 30 having six 20 mm by 30 mm plates of Li6 glass and the optical detector 16 includes two R3991 PMTs (each having an outside diameter of about ¾ inches, MWD qualified up to 175 degrees C.). Both PMTs are optically connected to the whole internal optical volume.

The design shown in FIG. 16, in one embodiment, is based on the use of two 3991 PMTs with the smallest outside diameter among currently available PMTs. Such a "pancake" like design allows for the decrease of the thickness of the detector 10 and as a result the detector 10 can be disposed in a smaller radiation detection component, such as a pocket in the body of a downhole measurement tool. In the case when both PMTs are optically connected to the internal detector volume of the scintillation assembly, for each scintillation event, part of the emitted light can be collected by one PMT and part of the light can collected by another one. The resulting pulses can then be summed together and obtained can be binned into a pulse height spectrum. In one embodiment, both PMTs have the same gain to avoid the appearance of artifacts in the resulting pulse height spectrum.

In one embodiment, the scintillation assembly 14 includes two different scintillation materials, each scintillation material configured to detect a different type of ionization particles, such as neutrons or gamma ray radiation. In one embodiment, the cladding 32 is made from a second scintillating material that is different from the scintillating material of the element 30. For example, the scintillating element 30 is a Li6 glass scintillator for detection of neutrons, and the cladding 32 is a NaI(Tl) material for detection of gamma rays. NaI(Tl) has an index of refraction equal to about 1.85 and high light transmittance up to 300 nm, and can be used as the optically transparent cladding 32 described herein. In this embodiment, the scintillation assembly 14 is capable of detecting multiple types of ionization particles with high sensitivity. In one embodiment, the detector 10 is configured as a phoswich detector. Methods for processing detection signals from such a detector are described to allow for differentiation between signals generated from different scintillating materials.

To resolve pulses in the detector signal caused by light pulses emitted in the scintillating element 30 (e.g., Li6 glass) and the cladding 32 (e.g., NaI(Tl)), a method is provided that uses the difference in the time of light emission or decay time of each scintillation material and related differences in the shape of pulses in a detector signal. For example, Li6 glass has a time of light emission constant "$\tau_1$" of 20 to 40 ns and NaI(Tl) has a time of light emission constant "$\tau_1$" of 245 ns. In general, if a charge sensitive preamplifier is used by the detector, the pulse shape in the detector signal can be described by a double exponential decay (DED) formula:

$$I(t)=I_0(\exp(-(t-t_0)/\tau_1)-\exp(-(t-t_0)/\tau_2)),$$

where: "$I_0$" is the pulse amplitude, "$t_0$" is the pulse time of arrival, and $\tau_1$ and $\tau_2$ are time constants defined by the scintillator properties ($\tau_1$ is time of light emission of scintillator) and by the preamplifier parameters ($\tau_2$ is integration time of charge sensitive preamplifier).

Figure 17:
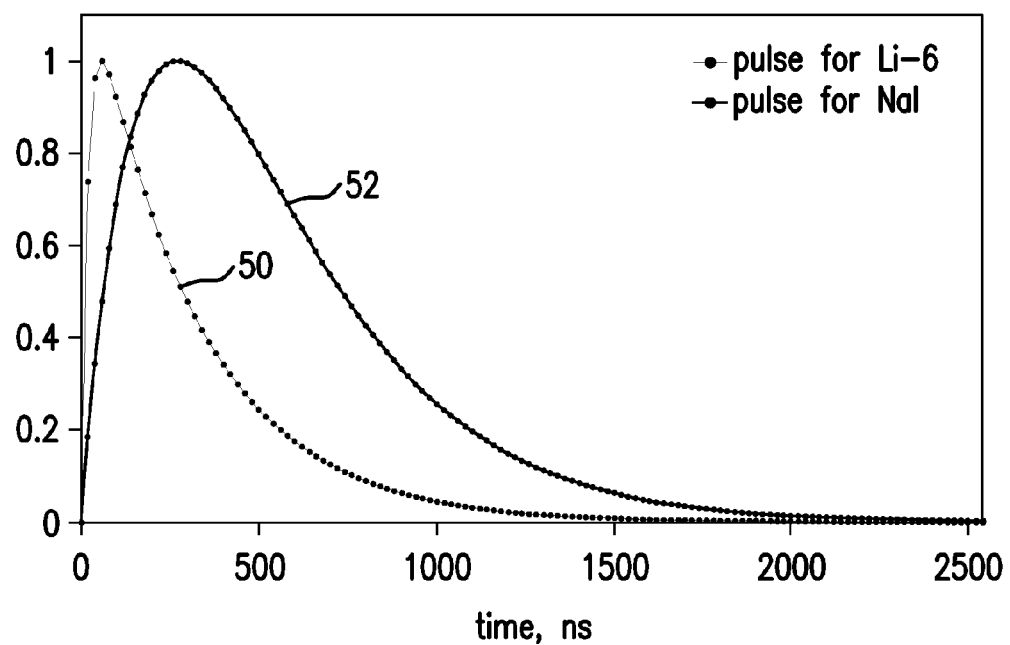
FIG. 17 shows constituent pulses generated by a scintillation detector equipped with a scintillation assembly that includes two scintillating materials.

An example of individual constituent pulse signals from a detector including Li6 glass ($\tau_1$=20 ns) or NaI(Tl) ($\tau_1$=250) is shown in FIG. 17. The integration time constant "$\tau_2$" of the preamplifier in this example is 300 ns. The pulse produced by Li6 glass is shown as a first amplitude pulse 50 and the pulse produced by NaI(Tl)) is shown as a second amplitude pulse 52. These pulses are not individually discernable from a detection signal generated by the detector.

Figure 18:
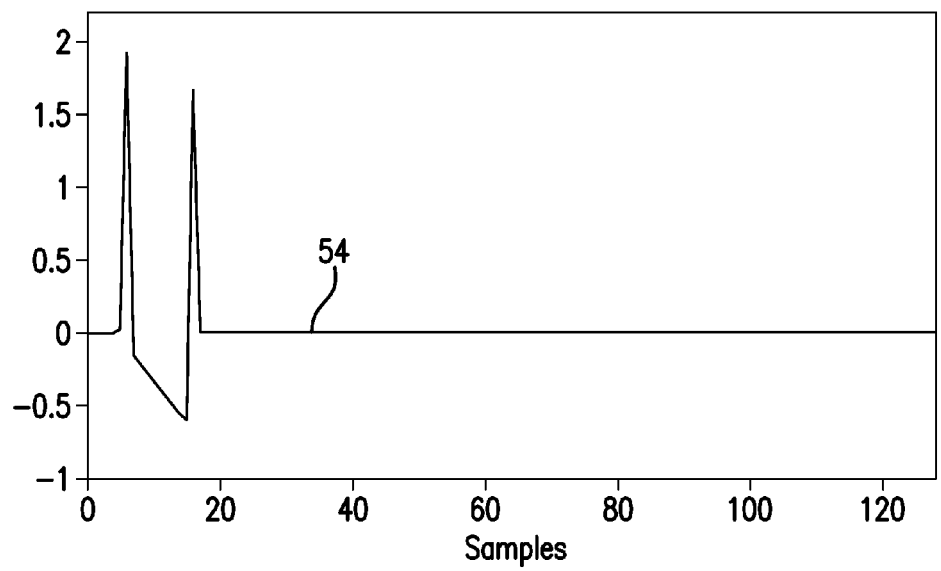
FIG. 18 shows an exemplary filter function for use in a method of resolving signals received from multiple scintillation materials.

In the method for resolving signals received from multiple scintillation materials, a signal including one or more pulses is generated by the detector, where each pulse is due to a light pulse originated either in one or another component (e.g., the scintillating element 30 and the cladding 32) of the scintillation assembly 14 made of different scintillation materials. In one embodiment, a filter function is applied to the detector signal consisting of pulses produced by different scintillators to aid in differentiating the origin of each pulse. The filter function, in one embodiment, is calculated to convert each DED pulse with a larger value of $\tau_1$ (e.g., pulse produced by NaI(Tl) scintillator) into a narrow and symmetrical unipolar pulse. An example of a filter function 54 is shown in FIG. 18, which is calculated for a DED pulse produced by a NaI(l) scintillating material to produce the symmetrical parabolic pulse after application of this filter to a DED pulse produced by a NaI(Tl) part of the scintillation assembly of the detector under consideration. An exemplary filter function may be calculated according to a method described in S. Smith, "Digital signal processing: a practical guide for engineers and scientists" 2003, Newnes, chapter 17, the contents of which are hereby incorporated by reference in their entirety.

Figure 19:
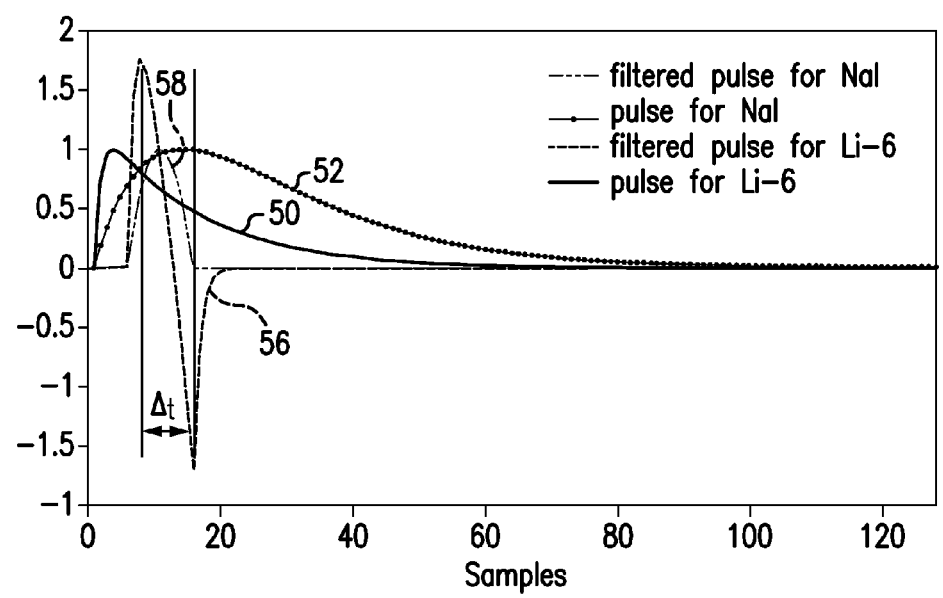
FIG. 19 shows unipolar and bipolar pulses generated via the filter function of FIG. 18.

As shown in FIG. 19, convolution of the pulses 50 and 52 with the filter 54 changes the pulses 50 and 52 into pulses with new shapes, referred to as filtered pulses 56 and 58. In the embodiment where pulse 50 is produced by Li6 glass and the filter 54 is calculated according to the above description, filtering produces a filtered Li6 glass pulse 56 having one positive and one negative maximum or bipolar pulse shape, while the filtered pulse 58 by NaI(Tl) has only one positive maximum or unipolar pulse shape. The filter function is not limited to the types described herein, and may be any function configured to generate a unipolar pulse for a DED pulse produced by one scintillator present in the detector and a bipolar pulse for a DED pulse produced by another scintillator.

The detection signal consists of a mixture of pulses with two different time structures and different amplitudes. The received signal can be described by:

$$I(t_i) = I_0 + \sum_j I_j^{NaI}(\exp(-(t_i - t_j)/\tau_1^{NaI}) - \exp(-(t_i - t_j)/\tau_2)) + \sum_k I_k^{Li-6}(\exp(-(t_i - t_k)/\tau_1^{Li-6}) - \exp(-(t_i - t_k)/\tau_2)) + I_n(t_i)$$

where: "I" is the pulse amplitude, "$t_j$" is the pulse time of arrival of a first scintillator signal (e.g., a NaI(Tl) scintillator signal), "$t_k$" is the pulse time of arrival of the a second scintillator signal (e.g., a Li6 glass scintillator signal), $\tau_1^{NaI}$ and $\tau_1^{Li-6}$ are time constants for each scintillator, and $\tau_2$ is the preamplifier time constant. The non-filtered detector signal contains only positive pulse maxima, and a simple peak detection algorithm cannot resolve pulse maxima for two different pulse types generated by a first scintillator and a second scintillator present in the detector. Filtering using a function such as described above converts the detector signal into a signal containing both positive pulses corresponding to pulses emitted by the first scintillator (e.g., NaI(Tl)) and the second scintillator (e.g., Li6 glass) and negative pulses corresponding only to pulses emitted by the second scintillator (e.g., Li6 glass). More over, as can be seen from FIG. 19, the distance "$\Delta t$" between negative and positive pulses in the filtered signal is the same for the DED pulse with any value of amplitude $I_k^{Li-6}$. Based on these properties, different algorithms or embodiments of the method can be used, i.e., when only a counts per second parameter for the signals produced by Li6 glass and NaI(Tl) is to be determined, or when spectroscopic measurements (e.g., when spectra should be created from signals generated by the different scintillators) should be performed.

In one embodiment, the method includes applying the filter to the signal, and identifying "positive" pulses and "negative" pulses in the filtered signal using, e.g., a simple peak detector algorithm. Positive pulses refer to signal values on the same side of the time/sample axis as the received pulses in the unfiltered signal.

Count rate parameters for "positive" ($CR^+$) and "negative" ($CR^-$) pulses are calculated by dividing the counts for the identified positive pulses by the time length of the signal sequence, and dividing the counts for the identified negative pulses by the time length of the signal sequence. $CR^-$ is equal to the count rate of the signal produced by the Li6 glass scintillator of the detector, and the difference between $CR^+$ and $CR^-$ ($|CR^+ - CR^-|$) is equal to the count rate of the signal produced by the NaI(Tl) scintillator. This embodiment is suited for applications such as formation Sigma measurements.

In one embodiment, the method includes applying the filter to the signal, and finding (using, e.g., a suitable peak detection algorithm) the intensity and position of the peaks in the filtered signal sequence to identify $\{t_0^+, I_0^+\}$ for "positive" pulses and $\{t_0^-, I_0^-\}$ for "negative" pulses in the filtered signal.

To obtain the constituent pulse from the first (e.g. Li6 glass) scintillator, negative pulses are removed from the positive pulse $\{t_0^+, I_0^+\}$ that satisfy the following condition:

$$\text{if } \Delta t - \delta t < t_{0j}^+ - t_{0k}^- < \Delta t + \delta t$$

where $\delta t$ is the precision of the pulse position identification and k is the some "negative" pulse when $j^{th}$ positive pulse should be excluded.

When negative pulses satisfying this condition are removed from the filtered signal, the remaining positive pulse ("$\{t_0^+, I_0^+\}_{excl}$") is indicative of the NaI(Tl) signal.

Energy spectra can be derived through binning for $\{t_0^-, I_0^-\}$ for Li6 glass signal ($I^{Li-6}(E^{Li-6})$) and through binning $\{t_0^+, I_0^+\}_{excl}$ for NaI(Tl) signal ($I^{NaI}(E^{NaI})$). Obtained spectra $I^{Li-6}(E^{Li-6})$ and $I^{NaI}(E^{NaI})$ correspond to the true spectra produced by Li6 glass and NaI(Tl) segments of phoswich detector after recalibration. This embodiment is suited for application such as neutron porosity well logging measurements with Li6 glass detectors and for pulsed neutron spectroscopy formation evaluation measurements. It is noted that the described embodiments are not limited to the types of scintillating materials herein.

Figure 20:
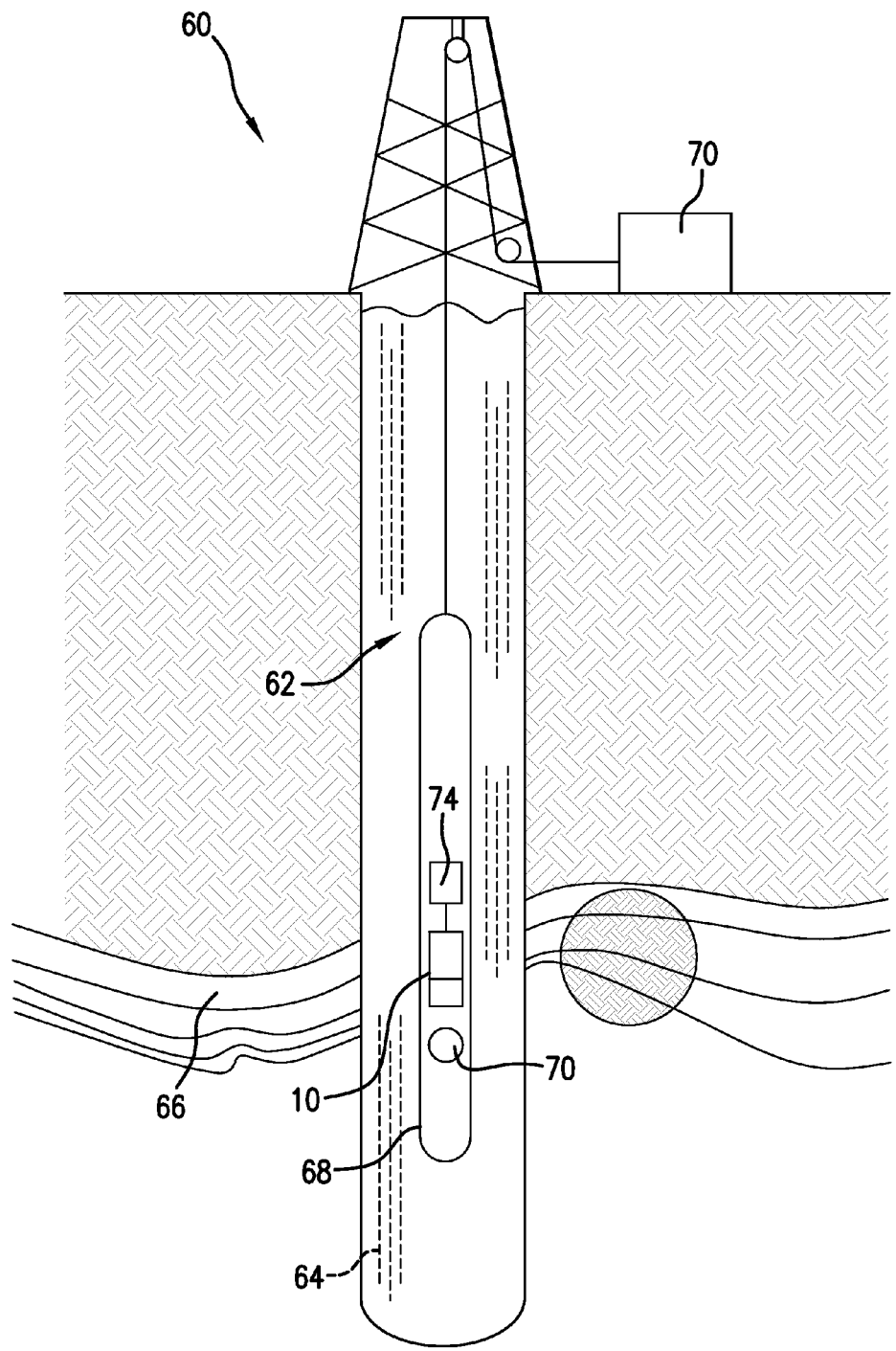
FIG. 20 is a side cross-sectional view of an embodiment of a subterranean well drilling, evaluation, exploration and/or production system.

FIG. 20 illustrates an exemplary application of the scintillation detectors and methods described herein. FIG. 20 includes an embodiment of a subterranean well drilling, evaluation, exploration and/or production system 60 that includes a borehole string 62 that is shown disposed in a borehole 64 that penetrates at least one earth formation 66 during a subterranean operation. In one embodiment, the borehole string includes a downhole tool 68 such as a well logging tool. In this example, the downhole tool 68 is a wireline tool, but is not limited thereto, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings. In one embodiment, the tool 68 is equipped with transmission equipment to communicate ultimately to a surface processing unit 70. Such transmission equipment may take any desired form, and different transmission media and methods may be used. Examples of connections include wired, fiber optic, wireless connections and memory based systems.

The downhole tool 68, in one embodiment, is configured as a pulsed neutron tool. The tool 68 includes, for example, at least one pulsed neutron source 70 and at least one radiation detector 10. In one embodiment, electronics 74 are also included for storing, transmitting and/or processing signals and/or data generated by the radiation detector 10. An associated method includes disposing the downhole tool into a borehole and emitting neutrons into the formation. Resulting gamma ray signals are received by the radiation detector(s) and processed to generate pulse spectra that are used to estimate various properties of the formation.

The apparatuses and methods described herein have various advantages over prior art apparatuses and techniques. The precision and accuracy of the signals such as the neutron peak intensity extracted from pulse height spectra measured by Li6 glass detectors defines the precision and accuracy of the associated neutron flux measurement and is defined by how well the neutron peak can be resolved in the measured pulse height spectra. The relatively high value of internal light absorption of Li6 glass causes distortion of the neutron peak from the ideal Gaussian shape in the form of a long tail located from the higher energy side of the main peak in a pulse height spectrum. In addition, the rapid deterioration of light yield parameters at high temperatures causes a broadening of the peak and a shift to the lower energy side of the spectrum where it overlaps with background noise. These two phenomena make the accuracy of the extraction of true intensity of neutron peak from the spectra measured by Li6 glass detectors at high temperatures (e.g., greater than 150 degrees C.) very low. The apparatuses and methods described herein substantially improve the performance of scintillation detectors such as long Li6 glass detectors through an optimized optical design and packaging of the scintillation assembly. For example, the apparatuses and methods described herein reduce and/or minimize the distance through which light travels through the scintillating material to increase and/or maximize the amount of emitted light collected by the photodetector(s).

In connection with the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

What is claimed is:

1. A scintillation detector comprising:
a photodetector;
a first scintillating material configured to emit light in response to exposure to neutrons, the scintillating material having a first index of refraction;
a second scintillating material having a second index of refraction that is less than the first index of refraction, the second scintillating material having a first surface disposed in optical contact with a surface of the first scintillating material and a second surface disposed in optical contact with a surface of the photodetector, the second scintillating material configured to transmit the emitted light; and
a processor configured to perform:
applying a filter configured to convert a pulse produced by one of the first and second scintillation materials into a unipolar pulse and convert a pulse produced by another of the first and second scintillation materials into a bipolar pulse; and
identifying the constituent pulses corresponding to being produced by the first scintillating material and being produced by the second scintillating material based on the presence of positive and negative maxima.

2. The apparatus of claim 1, wherein the optically transparent material has a light absorption coefficient that is less than a light absorption coefficient of the scintillating material for one or more wavelengths of light emitted by the scintillating material.

3. The apparatus of claim 1, wherein the second surface of the optically transparent material is disposed in optical contact with an optical window of the photodetector.

4. The apparatus of claim 1, wherein the scintillating material is configured as one of a hollow shape, a hollow cylinder, a hollow hexagon and a hollow octagon, and the optically transparent material is configured as one of a solid shape, a solid cylinder, a solid hexagon and a solid octagon in contact with an interior surface of the scintillating material.

5. The apparatus of claim 4, wherein the optically transparent material includes an outer transparent layer disposed between the scintillating material and the reflective material.

6. The apparatus of claim 1, wherein the scintillating material includes opposing surfaces through which emitted radiation can propagate, and at least the opposing surfaces are disposed in optical contact with the optically transparent material.

7. The apparatus of claim 6, wherein the scintillating material is disposed as a flat plate having a thickness, a length and a width, the opposing surfaces being defined by the length and the width.

8. The apparatus of claim 1, wherein the scintillating material is a lithium-6 scintillation material.

9. The apparatus of claim 1, further comprising a reflective material at least partially surrounding the scintillating material and the optically transparent material, the reflective material configured to reflect the emitted light and direct the emitted light toward the photodetector.

10. The apparatus of claim 1, wherein one of the first and second scintillating materials is a lithium-6 scintillation material configured to detect neutrons, and another of the first and second scintillating materials is a sodium iodide material configured to detect gamma rays.

11. A method of processing a scintillation detection signal, comprising:
  receiving a detection signal from a scintillation detector, the scintillation detector including a first scintillating material and a second scintillating material, the second scintillating material disposed in optical contact with the first scintillating material and configured to transmit light emitted from the first scintillating material;
  applying a filter configured to convert a pulse produced by one of the first and second scintillation materials into a unipolar pulse and convert a pulse produced by another of the first and second scintillation materials into a bipolar pulse;
  identifying positive and negative maxima in the filtered signal; and
  identifying the constituent pulses corresponding to being produced by the first scintillating material and being produced by the second scintillating material based on the presence of positive and negative maxima.

12. The method of claim 11, wherein the signal includes constituent pulses from each of the first and second materials.

13. The method of claim 11, wherein the filter is calculated using the shape of a pulse in the detector signal produced by one of the first and second scintillation materials.

14. The method of claim 11, wherein the filter is configured to generate a positive parabolic pulse for the constituent pulses corresponding to the first scintillating material.

15. The method of claim 11, wherein identifying the constituent pulses includes dividing the total counts associated with the positive maxima by a time length of the detection signal to calculate a positive count rate ($CR^+$), dividing the total counts associated with the negative maxima by the time length to calculate a negative count rate ($CR^-$), identifying a count rate associated with the second scintillating material based on the $CR^-$, and identifying a count rate associated with the first scintillating material based on a difference between the $CR^+$ and the $CR^-$.

16. The method of claim 13, wherein identifying the constituent pulses corresponding with being produced by the first scintillating material includes identifying the constituent pulses that are associated with the first scintillating material by:
  calculating an intensity and a position of each of the positive pulses and the negative pulses, and removing negative pulses from a selected positive pulse that meet the following condition:

$$\Delta t - \delta t < t_{0j}^+ - t_{0k}^- < \Delta t + \delta t,$$

where "$\Delta t$" is a time difference based on the time constant, "$t_{0j}^+$" is a position of the selected positive pulse, "$t_{0k}^-$" is a position of a negative pulse, and "$\delta t$" is a precision of the pulse position identification.

17. The method of claim 11, wherein the scintillation detector includes a photodetector and a reflective material at least partially surrounding the first and second scintillating materials, the reflective material configured to reflect the emitted light and direct the emitted light toward the photodetector, the second scintillating material having an absorption coefficient that is less than an absorption coefficient of the first scintillating material for one or more wavelengths of light emitted by the first scintillating material.

18. An apparatus for estimating at least one property of an earth formation, comprising:
  a carrier configured to be disposed in the formation;
  a fast neutron source disposed at the carrier and configured to irradiate the formation;
  at least one scintillation detector disposed at the carrier and configured to measure at least one of neutrons scattered by the formation and gamma rays emitted by the formation, the at least one scintillation detector including:
    a photodetector;
    a first scintillating material configured to emit light in response to exposure to ionization particles; and
    a second scintillating material, the second scintillating material disposed in optical contact with the first scintillating material and configured to transmit light emitted from the first scintillating material;
  ; and
  a processor in communication with the at least one scintillation detector to receive measurement data and estimate at least one property, the processor configured to perform:
  receiving a detection signal from the scintillation detector,
  applying a filter configured to convert a pulse produced by one of the first and second scintillation materials into a unipolar pulse and convert a pulse produced by another of the first and second scintillation materials into a bipolar pulse;
  identifying positive and negative maxima in the filtered signal; and
  identifying the constituent pulses corresponding to being produced by the first scintillating material and being produced by the second scintillating material based on the presence of positive and negative maxima.

19. The apparatus of claim 18, wherein the fast neutron source is a pulsed neutron source, and the scintillating material is configured to detect at least one of gamma rays emitted from the formation and neutrons scattered by the formation.

20. The apparatus of claim 18, wherein the at least one scintillation detector is configured to measure neutrons scattered by the formation and gamma rays emitted by the formation simultaneously.

* * * * *